United States Patent
Bösinger et al.

(10) Patent No.: US 6,643,465 B1
(45) Date of Patent: Nov. 4, 2003

(54) METHOD FOR CHECKING A RING OPTICAL NETWORK LINE FOR DATA TRANSMISSION BETWEEN A PLURALITY OF NETWORK SUBSCRIBERS IN A MOTOR VEHICLE

(75) Inventors: Marcus Bösinger, Ingersheim (DE); Jens Brandes, Böblingen (DE); Dieter Marquardt, Herrenberg (DE); Peter Merget, Esslingen (DE); Franz-Josef Petry, Kernen (DE); Heinz-Jürgen Schwarz, Althütte (DE); Dieter Seidl, Reutlingen (DE)

(73) Assignee: DaimlerChrysler AG, Stuttgart (DE)

( * ) Notice: Subject to any disclaimer, the term of this patent is extended or adjusted under 35 U.S.C. 154(b) by 610 days.

(21) Appl. No.: 09/607,654
(22) Filed: Jun. 30, 2000

(30) Foreign Application Priority Data

Jul. 9, 1999 (DE) .......................... 199 31 838

(51) Int. Cl.⁷ .............................................. H04B 10/20
(52) U.S. Cl. .............................. 398/59; 398/9; 398/10; 398/61; 398/63; 398/100; 362/32; 362/23; 362/26; 362/29; 701/33; 701/29; 701/32
(58) Field of Search ...................... 398/59, 9, 10, 398/61, 63, 100; 362/32, 23, 26, 29; 701/33, 29, 32

(56) References Cited

U.S. PATENT DOCUMENTS 4,930,049 A * 5/1990 Davenport et al. .......... 362/32
5,040,168 A * 8/1991 Maue et al. ................. 359/115
5,957,985 A * 9/1999 Wong et al. .................. 701/33

FOREIGN PATENT DOCUMENTS

JP        07-321838       12/1995

OTHER PUBLICATIONS

VDI Berichte 1415, Verein Deutscher Ingenieure, VDI–Gesellschaft Fahrzeug– Und Verkehrstechnik "Elektronik Im Kraftfahrzeug—Electronic Systems for Vehicles," Tagung Baden–Baden, 8 und 9 Oct. 1998.

* cited by examiner

Primary Examiner—Leslie Pascal
Assistant Examiner—Hanh Phan
(74) Attorney, Agent, or Firm—Crowell & Moring LLP

(57) ABSTRACT

A method for checking a ring optical network line for data transmission between a plurality of network subscribers in a motor vehicle, wherein one network subscribers carries out a master function, wherein, apart from the optical network line, there is a further communication line which has a star structure. The network subscribers having the master function is arranged in the centre of the star structure and is connected directly via the communication line to every other network subscribers. The optical network line is checked by the network subscriber having the master function outputting a start signal to the individual network subscribers. The individual network subscribers acknowledge the start signal for the network subscribers the master function via the communication line. After the start signal, the network subscriber having the master function outputs an initialization signal via the optical network line.

10 Claims, 2 Drawing Sheets

METHOD FOR CHECKING A RING OPTICAL NETWORK LINE FOR DATA TRANSMISSION BETWEEN A PLURALITY OF NETWORK SUBSCRIBERS IN A MOTOR VEHICLE

The invention relates to a method for checking a ring optical network line for data transmission between a plurality of network subscribers in a motor vehicle.

BACKGROUND OF THE INVENTION

Apart from the known CAN networks for signal transmission, it is known for a network in which the data are transmitted optically to be provided in motor vehicles. This network is constructed as a ring and connects a radio, CD changer, sound amplifier, telephone, mobile telephone and voice control system via an optical databus ($D^2B$).

In contrast to previous asynchronous, that is to say event-controlled, data transmission as in the case of the CAN bus, such communication and information systems require synchronous data transmission at higher Baud rates, which can be transmitted using optical signals.

For example, as a network subscriber, the radio can carry out the master function and at the same time be used as a gateway to the internal bus and diagnostic system. The CAN-B interface allows information from the $D^2B$ system to be transmitted to other systems and, conversely, data to be transmitted from the vehicle to the $D^2B$ system. Particularly intensive interchange takes place between a combination instrument and the network subscriber having the master function, since the $D^2B$ components can also be controlled via the steering wheel, and information can be displayed via the combination instrument display.

All the audio signals, such as music or speech, are initially transmitted in digital form from the component which produces them via the $D^2B$ bus either to the network subscriber having the master function or, possibly, to the sound amplifier, where they are converted into an analogue signal and are reproduced via the vehicle loudspeakers. If a telephone system is installed in a vehicle, this has the advantage that there is no need to fit any additional loudspeakers for hands-free operation.

In contrast to conventional vehicle networking, the system components are not linked to one another in a bus, tree or star structure, but in a ring structure. This means that each ring subscriber receives modulated light via the receiving device, carries out signal preprocessing, and then passes on the signal via the optical output. The advantage in this case is that the ring may have any desired number of components added to it, since the maximum optical power is available at the output of each appliance. Since the data are transmitted optically, this is always done unidirectionally, that is to say only in one direction. Optical transmission advantageously allows problems relating to EMC to be avoided.

The operation of such a ring optical network line is described in detail, for example, in VDI Reports No. 1415, entitled Elektronik im Kraftfahrzeug, Tagung Baden-Baden 8 and 9 October 1998=Electronic systems for vehicles/VDI-Gesellschaft Fahrzeug- und Verkehrstechnik, Düsseldorf: VDI Verlag, 1998 (VDI Reports; 1415) ISBN 3-18-091415-7.

Furthermore, U.S. Pat. No. 4,930,049 discloses an arrangement in which both an electrical control line and an optical control line are arranged in a star arrangement in a motor vehicle. This allows the components in the vehicle to be actuated either by means of an electrical control signal or by means of an optical control signal.

The object of the present invention is to propose a method and an apparatus in order to allow such an optical network line to be checked for possible faults.

SUMMARY OF THE INVENTION

A method according to the invention checks a ring optical network line for data transmission between a plurality of network subscribers in a motor vehicle, wherein one network subscriber carries out a master function, in that apart from the optical network line there is a further communication line which has a star structure and in which the network subscriber having the master function is arranged in the centre of the star structure and is connected directly via the communication line to every other network subscriber, wherein the optical network line is checked by the network subscriber having the master function outputting a start signal to the individual network subscribers via the communication line in a first test step at the start of operation of the optical network line, wherein the individual network subscribers acknowledge the start signal for the network subscriber having the master function via the communication line, wherein, in a second test step after the start signal, the network subscriber having the master function outputs an initialization signal via the optical network line, wherein correct operation of the ring optical network line is identified if the network subscriber having the master function receives a signal which corresponds to a nominal signal via the optical network line within a predetermined time interval.

Thus, first of all, it is advantageously possible to test whether all the network subscribers have a reliable electrical power supply and whether the connection can be set up via the communication line. In the next step, it is then possible to check whether communication can take place via the optical ring line once the other fault sources have been excluded.

The nominal signal may in this case correspond to the initialization signal itself. Thus, in this case and in this test step, the signal is just passed on by the individual network subscribers (possibly amplified) as it was received. It is likewise possible to use the individual network subscribers to change the signal in a characteristic manner, so that correct operation of the individual network subscribers can furthermore be checked.

In general, when interruptions occur in bus systems having a ring structure (for example $D^2B$ OPTICAL), the entire data flow breaks down. This leads to failure of all the systems on the bus. This now results in the problem that, in contrast to multi-master bus systems (for example CAN), the individual controllers can no longer respond in order to diagnose the fault via the ring optical network line. The present invention thus advantageously allows the location of the fault which may have occurred to be found with comparatively little effort.

In an embodiment of the invention method, a disturbance in the voltage supply to a network subscriber or an interruption in the connection via the communication line from the network subscriber having the master function to the network subscriber is identified if the network subscriber having the master function does not receive any acknowledgement of the start signal by the corresponding network subscriber.

A fault cause can thus advantageously be located.

In a further embodiment of the invention method, a network subscriber sends a fault-tracing signal, which characterizes this network subscriber, via the communication line if it has not received any initialization signal via the optical network line, wherein the network subscriber having the master function identifies a fault which relates to the transmission of an optical signal from the network subscriber which, in the opposite direction to the transmission direction of the signal in the ring optical network line is arranged upstream of that network subscriber which has sent a fault-tracing signal and which, in the transmission direction of the ring optical network line is arranged closest to the network subscriber having the master function, or which relates to reception of an optical signal by the network subscriber which sent the fault-tracing signal and which, in the transmission direction of the ring optical network line, is arranged closest to the network subscriber having the master function, or which relates to the ring optical network line between that network subscriber which, in the opposite direction to the transmission direction of the signal in the ring optical network line, is arranged. upstream of that network subscriber which sent the fault-tracing signal and which, in the transmission direction of the ring optical network line, is arranged closest to the network subscriber having the master function, and to this same network subscriber which sent the fault-tracing signal and, in the transmission direction of the ring optical network line, is arranged closest to the network subscriber having the master function.

In this case, for fault tracing, it must be remembered that the optical signals run around a ring. Thus, if no signal arrives at one network subscriber, this network subscriber cannot pass on any signal either. Thus where the fault-tracing signals of the individual subscribers are sent via the communication line, the network subscriber having the master function will receive fault-tracing signals from all those network subscribers which are located downstream of the fault location in the transmission direction of the ring optical network line. For systematic fault tracing purposes, therefore, the first fault to be rectified in this case would therefore be that which was observed in the network subscriber which, in the transmission direction of the ring optical network line, is arranged closest to the network subscriber having the master function. Another test procedure can be carried out once this fault has been rectified. The other fault entries may arise only from the fact that it has not been possible for a network subscriber to pass on any signals since this subscriber has not been able to receive any signals. Thus, there need not be any further faults on the ring optical network line.

In the method according to claim 4, a network subscriber transmits a fault signal which characterizes this network subscriber, via the optical network line, if it has not received any initialization signal via the optical network line, wherein, on reception of this fault signal, the network subscriber having the master function identifies a fault which relates to the transmission of an optical signal by that network subscriber which, in the opposite direction to the transmission direction of the signal in the ring optical network line, is arranged upstream of that subscriber which sent a fault signal, or which relates to the reception of an optical signal by that network subscriber which sent the fault signal, or which relates to the ring optical network line between that network subscriber which, in the opposite direction to the transmission direction of the signal in the ring optical network line, is arranged upstream of that network subscriber which sent the fault signal, and the same network subscriber, wherein the network subscriber having the master function identifies a fault which relates to the transmission of an optical signal by that network subscriber which, in the opposite direction to the transmission direction of the signal in the ring optical network line, is arranged upstream of the network subscriber having the master function, or which relates to reception of an optical signal by the network subscriber having the master function, or which relates to the ring optical network line between that network subscriber which, in the opposite direction to the transmission direction of the signal in the ring optical network line, is arranged upstream of the network subscriber having the master function, and the same network subscriber, if the network subscriber having the master function does not receive a fault signal. Thus, the location of a fault is found by transmitting a signal via the ring optical network line. In some circumstances, it is possible for signal transmission through the ring optical network line to be interrupted at more than one point. In this case, since the fault signal is transmitted via the ring optical network line, a fault is initially identified at that point which, in the opposite direction to the transmission direction in the ring optical network line, is the closest to the network subscriber having the master function. Once this fault has been rectified, it is then possible to look for other faults which may be present.

According to on embodiment of the invention method, the respective network subscriber can use various criteria to identify the fact that it has not received any initialization signals. Firstly, time criteria may be defined for this purpose in such a way that a network subscriber identifies the fact that it is not received any initialization signal if no initialization signal has been received by this network subscriber once a specific time threshold has passed since the network subscriber received the start signal via the communication line. It is also possible for the network subscriber having the master function to transmit a fault acknowledgement signal via the communication line, if the network subscriber having the master function has not received any signal via the ring optical network line, or has received only a signal which does not correspond to the nominal signal, within a specific time threshold.

In another embodiment of the invention, a test set can be used to replace the function of a receiver or a transmitter of a network subscriber in the start and initialization phase.

In another embodiment of the invention, a test set can be used to replace the function of a network subscriber, with the respective associated receiver and transmitter, in the start and initialization phase.

In the method just described, individual components can advantageously be replaced, for the purpose of systematic fault tracing, once the location of the fault has been found. Since the test is then repeated, it is possible to check whether the network is functioning after the replacement has been carried out. In this way, faulty components can be determined.

Since the functional scope of the test set is reduced in comparison to normal operation of the network, the logistics complexity can advantageously be minimized, since one test set may be used to replace the network subscribers in the test phase.

BRIEF DESCRIPTION OF THE DRAWING

An exemplary embodiment of the invention will be explained once again in the following text with reference to the drawings, in which.

DETAILED DESCRIPTION

Figure 1:
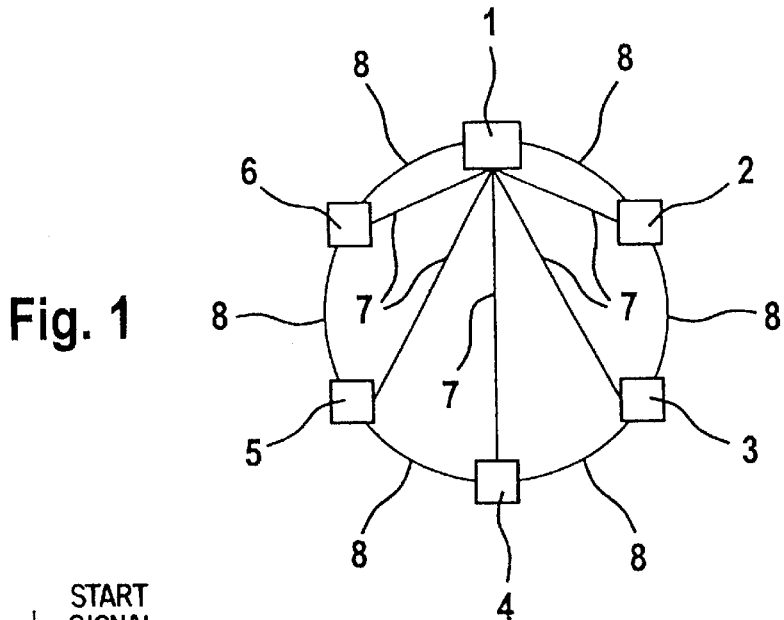
FIG. 1 shows an outline illustration of an arrangement having a ring optical network line and a communication line.

The arrangement will be explained in the following text with reference to FIG. 1. Starting of the fully equipped system, and thus the process of carrying out functional testing, can be initiated by various activities or events.

Switching on the network subscriber having the master function 1, that is to say by pressing the switching-on button, inserting or turning the ignition key, in such a way that the ignition is switched on.

Via the mobile telephone or telephone, for example as a result of an incoming call or the process of dialling a telephone number.

Since the currently used electro-optical transducer elements (FOTs) in the appliances 1–6 result in an excessively high quiescent current draw in the switched-on stage, the $D^2B$ bus and the FOTs are switched off when they are not required. Optical transmission is started via an additional communication line 7, which is in the form of a copper wire and is referred to as a "wake-up" line in the following text.

When one of the switching-on conditions mentioned above has been satisfied, the respective component sends a wake-up pulse to all the ring subscribers. This is done by setting the wake-up line to a low level for between 50 and 100 ms.

Shortly after the wake-up pulse, the network subscriber having the master function 1 starts to transmit an initialization signal via the ring optical network line 8. If the ring optical network line 8 is closed and no electrical faults are present, the receiving side of the network subscriber having the master function 1 will lock on, that is to say it will receive modulated light, within 500 ms. The appliances 1–6 can thus communicate via the ring optical network line 8.

First of all, the network subscriber having the master function 1 transmits the so-called set position message. The appliances 2–6 use this message to determine their node address, and notify this to the network subscriber having the master function 1 by means of an actual position message.

The next step during the system starting-up phase is initialization of the appliance addresses. The individual components 1–6 send a message to their own appliance address most recently stored in the memory, in order to check whether there are any other bus subscribers with the same address in the ring. If this is not the case, the default address is stored.

Once the described processes have been completed, the system changes to the normal operating state.

$D^2B$ components such as a telephone, CD changer and voice-operated controller are diagnosed using a test set. The test set is connected to the network subscriber having the master function 1 (radio) via a communication line 8. The network subscriber having the master function 1 is used as a connection between the test set and the other bus subscribers 2–6, and passes the test set request on via the ring optical network line 8 to the controller 2–6 being addressed. The response from the controller 2–6 passes on the opposite route to the test set from the controller 2–6 via the network subscriber having the master function 1, which is used as the connection to the test set.

All system faults, such as an interruption in the ring optical network line 8 or a functional failure of appliances 2–6, which are identified by the network management are stored directly in the network subscriber having the master function 1, which is used as the connection to the test set.

All the faults which can be diagnosed are assigned a code. If a fault occurs in a component, this can be read via the test set and can be displayed on the screen by an indication of the fault code and a brief description. Stored faults may be deleted using the test set.

In order to allow diagnosis to be started, the network subscriber having the master function 1 must be switched on. The next step is for the test set to request that communication with the test set be set up. The network subscriber having the master function 1 and which is used as the connection to the test set uses a message to report to the ring subscribers 2–6 that the connection to the test set is in existence. After identification of this message, each component 2–6 switches to the diagnosis mode.

Information such as types, national variations, equipment fit, nominal/actual configuration are stored in the network subscriber having the master function 1 and which is used as the connection to the test set. This version coding is sent by the test set to the network subscriber having the master function 1 and which is used as the connection to the test set, and is stored there in a non-volatile memory. The network subscriber having the master function 1 and which is used as the connection to the test set passes this information on to the controllers 2–6, on request. This allows vehicle-specific self-configuration of the appliances 2–6.

Once the optical fibre conductor set and all the controllers 2–6 have been fitted, the $D^2B$ system can be started up.

There may be several reasons why this system cannot be switched on:

an electrical fault is present, for example an interruption in the voltage supply or the communication line at one or more components; plug connections have not been made optical fault, for example an interruption at any point in the optical ring; receiving or transmitting diodes defective; optical plug connections not made.

An advantageous feature of the present invention is that, with the test set which is connected to the network subscriber having the master function, most fault scenarios can be identified even without the assistance of complex equipment.

A wake-up test may be carried out to find the location of an electrical fault. The wake-up test may be started, for example, via the test set. A wake-up pulse with a duration of 500 ms is transmitted by the headunit 1. This start signal is interpreted by the other appliances 2–6 as the start of the diagnosis of the communication line 7. After 150 ms, the component 2 sets the communication line 7 to low level for 50 ms, thus indicating that it is present. Component 3 carries out the same procedure after 350 ms, etc. The network subscriber having the master function 1 monitors these actions and can thus also record the existence of the various components 2–6 by storing the sampled times in a memory block. In this case, the test is carried out only if the ring is not operating.

The memory is then read by the test set, and the result is displayed on the screen.

The various appliances 2–6 must therefore respond by means of a pulse in a specific sequence after precisely defined times.

$t = 150 \text{ ms} + (i-1) \times (50 \text{ ms} + 150 \text{ ms})$ i=1 CD changer
i=2 telephone
i=3 voice control
i=4 amplifier sound system
i=5 mobile telephone If the pulse occurs at some other point or if the pulse duration is not within the tolerance limit, the network subscriber having the master function 1 cannot interpret the result correctly. A fault can now be found very easily since each pulse corresponds to one $D^2B$ component 2–6. If an appliance 2–6 does not respond, either the communication line 7 is interrupted, or the voltage supply is defective.

If the system cannot be started up owing to an interruption in the ring optical network line 8, the so-called start fault cycle starts to run.

As has already been described, once a switch-off condition has been satisfied, the network subscriber having the master function 1 sends a wake-up pulse as a start signal via the communication line 7 to all the subscribers 2–6 in the ring, and starts to transmit an initialization signal via the ring optical network line 8. If no light arrives at the receiver diode (RX diode) within 500 ms, the timer in the network subscriber having the master function 1 is reset and the process is repeated. If the RX diode does not receive any light after the fourth attempt, the network subscriber having the master function 1 changes from the master mode to the slave mode. If the first component 2–6 after the discontinuity has already received four wake-up signals and has still not received any initialization signal after a subsequent waiting time of 1000 ms, it changes from the slave mode to the master mode and transmits a so-called nominal position message. All the subsequent components 2–6 enter their position. The network subscriber having the master function 1 can use this message to determine the number of subscribers after the discontinuity, and to determine the last functioning controller 2–6 in the rearward direction of the bus. The network subscriber having the master function 1 writes the recorded data to a memory, which can in turn be read by the test set and displayed on the screen.

The test set can advantageously identify whether it is in a ring with nominal data traffic (active $D^2B$ OPTICAL system with user data traffic), and then passes the data on the reception side on to the next bus segment. This function can be combined with the described method for finding the location of defective components in $D^2B$ OPTICAL systems, in order to allow a fault to be located locally.

In principle, the procedure for fault identification is as follows:

Step 1:
On-board diagnosis is used to determine whether a segment in the ring is defective. The defective segment in the ring is then determined.

Steps 2–4:
The defective component in the segment is then determined using the "$D^2B$ network tester" special tool.

Step 5:
If more than one fault is present, it is necessary, after carrying out steps 2–4, to check whether any other faults are present and, if necessary, the process recommences at step 1.

Steps 1 to 4 each have a plurality of parts.

Figure 2:
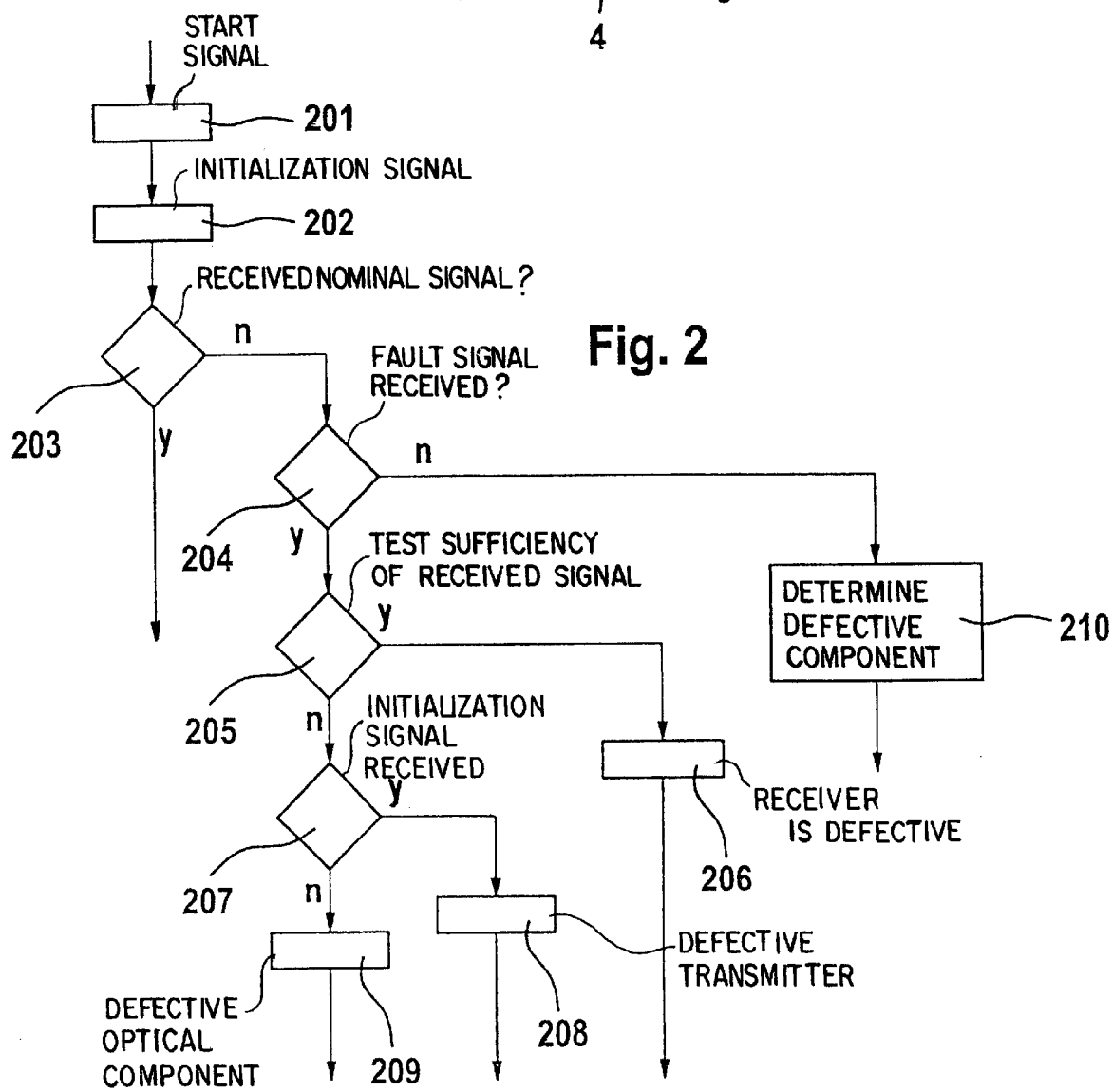
FIG. 2 shows a flowchart of a test procedure.

The method sequence will be explained in the following text with reference to FIG. 2. In method step 201, the network subscriber having the master function 1 sends a start signal via the communication line. The individual network subscribers acknowledge this start signal via the communication line, with this acknowledgement being evaluated by the network subscriber having the master function 1. This evaluation results in a table with controllers which have registered (actual state). This table is then compared with a further table containing controllers which should have registered (nominal state). The nominal state was programmed in as a configuration data item when the $D^2B$ OPTICAL system was first started up. If there is any discrepancy, a fault in the voltage supply of a network subscriber or in the link via the communication line to this network subscriber can be identified. A fault state may be stored in a memory which can be read externally, preferably in the network subscriber having the master function 1.

In step 202, the network subscriber having the master function 1 then transmits an initialization signal via the ring optical network line 8. A network subscriber can advantageously also be activated by this initialization signal if this network subscriber has not received a start signal. This has been found to be advantageous if the link via the communication line 7 from the network subscriber having the master function to the corresponding network subscriber is interrupted, but the network subscriber including its link to the ring optical network line 8 is operating correctly apart from this. In this situation, it is possible to communicate via the ring optical network line during normal operation. The fault can then be rectified during maintenance.

Step 203 is then used to check whether the network subscriber having the master function 1 has received a nominal signal. If the individual network subscribers continue to send the initialization signal when operating correctly in the initialization phase, without changing this initialization signal, this nominal signal corresponds to the initialization signal. If the initialization signal is changed in a characteristic manner by the individual network subscribers in order to allow any further fault states to be identified, this nominal signal corresponds to specific changes in the initialization signal.

Once the nominal signal has been received, a change can be made to a normal operating state, since it is possible to communicate via the ring optical network line.

If not, a jump is made to step 204 in which the network subscriber which has not been able to receive the initialization signal sends a fault signal via the ring optical network line. If such a fault signal has been received by the network subscriber having the master function 1, the "last still functioning segment" in the ring can be identified using the network subscriber sequence stored in the network subscriber having the master function 1 (nominal state of the registered appliances). This may be carried out in the vehicle, in the network subscriber having the master function or in the test set. The conclusion is then that the segment which is logically located upstream of the last segment which is still functioning (that is to say the segment which, in the opposite direction to the transmission direction of the ring optical network line, is upstream of the last segment which is still functioning) must have a defect since, otherwise, this segment would also be identified as being serviceable. In fact, until this point, it is not yet clear which components in this segment (transmitters, receivers, optical conductors including contacts) have caused the fault.

A jump is made to step 205, in which the defective component is determined. This may be done in a number of steps whose respective results allow a determined decision to be made on the next step which may still be necessary.

First of all, the receiver in the defective segment is determined and is then replaced by a test set. The ring is now woken up and a bus starting-up process is initiated by switching on the network subscriber having the master function. The test set is in this case used to check whether the received signal is sufficient. If this is the case, an indication is given (step 206) that the receiver which has been replaced by the test set is defective.

In this situation, once the network subscriber having the master function has been switched on once again, the ring is started up and all the remaining controllers (network subscribers) will operate since the test set simulates the replaced controller such that the data are passed on from the transmitter to the receiver in the next segment (repeater). The fault tracing process is thus complete.

If it was found during the check using the test set that no signal, an excessively weak signal or a signal which does not correspond to the initialization signal was received, then the receiver is assumed to be serviceable and the defective component is located in the optical conductor and transmitter.

In addition to or as an alternative to the receiver, the transmitter in the defective segment is now replaced by a further $D^2B$ network tester, in step 207. Switching on the network subscriber having the master function now wakes up the ring, and causes the bus to start up. Correct reception by the network subscriber having the master function can now be used, for example, to establish whether communication is now possible via the ring optical network line. The fault can then be traced to the corresponding transmitter in the segment. The signal from the test set which (as before) replaces the receiver can also be evaluated. If this signal is now identified as being adequate, a defective transmitter can once again be deduced. In this case, once the network subscriber having the master function has been switched on, the ring is started up and all the remaining controllers will operate. The fault situation is then displayed in step 208. The fault tracing process is then complete.

If, as before, it has not been possible to receive the initialization signal, or it has not been possible to receive it correctly, then, apart from the receiver, the transmitter is assumed to be serviceable and the defective component is traced to the optical conductor. This is displayed in step 209.

After replacing the optical conductor, another start attempt is made. It can then be expected that the system will operate correctly.

If, nevertheless, this is not the case, this indicates an intermittent fault or a transmitter with fluctuating transmission power (defective transmission power regulation). In this case, it is recommended that the transmitter be replaced and that the vehicle be monitored. If the ring fails once again, the optical conductor must also be replaced.

If it has not been possible for the network subscriber having the master function 1 to receive any fault signal in step 204, it can be deduced that the receiver in the network subscriber having the master function 1, the transmitter in the appliance which, in the opposite direction to the transmission direction of the ring optical network line, is arranged upstream of the network subscriber having the master function 1, or the optical conductor between this appliance and the network subscriber having the master function is defective. The rest of the fault tracing process is indicated in the flowchart by a block 210 whose contents, with regard to the procedure in the individual test steps, are equivalent to the corresponding steps 205 to 209.

Now, once the defective component in the defective segment of the ring has been determined and replaced, the process starts again with step 201 since a further segment could also be defective in the ring.

In some circumstances, the location of a fault can be found within tighter limits from the start by combining the evaluation of the identified fault states via the communication line and the ring optical network line. If a network subscriber has not reported via the communication line and if the network subscriber located downstream from this subscriber in the transmission direction of the optical network line is identified as the last correctly operating subscriber, it is possible to deduce with a relatively high level of confidence that there is a fault in that subscriber which did not report via the communication line, so that its components can be investigated first of all. In the described situation, it is possible to deduce with a very high level of confidence that the voltage supply is defective, since this is a defect which can explain the reported fault states via the communication line as well as via the ring optical network line.

The test set may be designed such that it can replace the receiver and the transmitter individually. For standardization purposes, the test set may also be designed such that it can completely replace a network subscriber for the start and initialization phase. In this case, the test set is equipped with a receiver, a signal preprocessing circuit and a transmitter. Since the receiver and transmitter in a segment are associated with different network subscribers, such replacement can likewise uniquely identify the fault.

Figure 3:
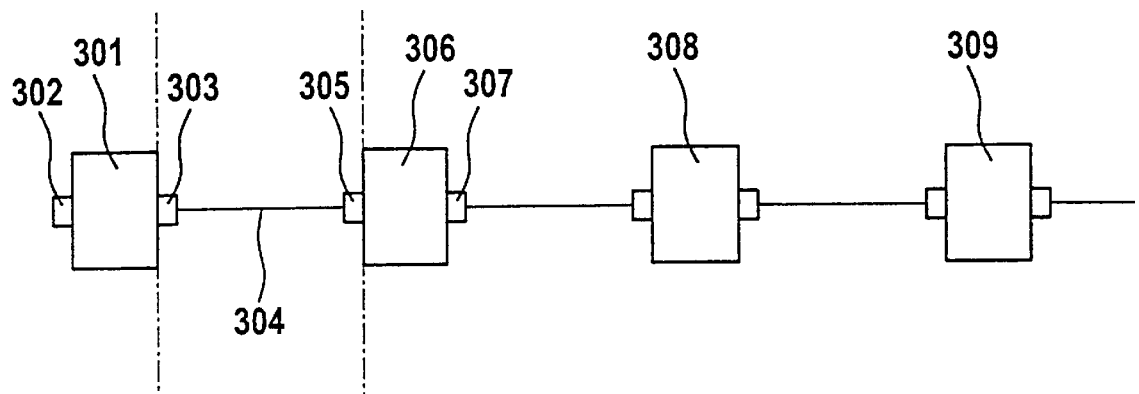
FIG. 3 shows an outline illustration of how a test set can replace individual parts of the network.

In order to explain these relationships, FIG. 3 shows network subscribers 301, 306, 308 and 309 which are connected via the ring optical network line, one part of which is provided with the reference number 304. The network subscriber 301 has a receiver 303 and a transmitter 302. The network subscriber 306 has a receiver 307 and a transmitter 305. The dashed-dotted lines indicate that a segment in which a fault may possibly have occurred may comprise the elements 303, 304 and 305. For systematic fault tracing, the test set may be designed such that it can replace the receiver 303 or the transmitter 305. The test set may also be designed such that it can replace a network subscriber 301, 306, 308 and 309 together with the associated receiver and transmitter. When fault tracing takes place in the described segment, the network subscriber 301 is replaced first of all, by which means it is possible to check on the basis of the previous fault localization process whether the receiver 303 is defective. If the network subscriber 306 is replaced, it is possible to check on the basis of the previous fault localization process whether the transmitter 305 is defective.

Although the invention has been described in detail with reference to certain preferred embodiments and specific examples, variations and modification exist within the scope and spirit of the invention as described and as defined in the following claims.

What is claimed is:

1. A method for checking a ring optical network line for data transmission between a plurality of network subscribers, wherein one network subscriber carries out a master function, the network subscriber carrying out the master function connected in a star configuration to the other network subscribers by communication lines, the method comprising the steps of:

(a) the network subscriber carrying out the master function transmitting a start signal via the communication lines to the other network subscribers;

(b) each of the other network subscribers acknowledging the start signal via its respective communication line;

(c) the network subscriber carrying out the master function transmitting an initialization signal via the optical network line; and (d) determining that the optical network is operating correctly if the network subscriber having the master function receives a signal that corresponds to a nominal signal via the optical network within a predetermined time interval.

2. The method according to claim 1, and further including the step of identifying a disturbance in a voltage supply to one of the network subscriber other than the network subscribers other than the network subscriber having the master function or an interruption in the connection between the network subscriber having the master function and one of the other network subscribers by the respective communication line if the network subscriber having the master function does not receive any acknowledgment of the start signal from that other network subscriber.

3. The method according to claim 1 and further including the steps of in the event that if one of the network subscribers other than the network subscriber having the master function does not receive the initialization signal it sends a fault-tracing signal via its respective communication line to the network subscriber having the master function that characterizes that network subscriber sending the fault-tracing signal, the network subscriber having the master function identifying a fault:

(a) which relates to transmission of an optical signal by one of the other network subscribers that, in a direction opposite to a direction of transmission in the optical network line, is arranged upstream of the network subscriber sending a fault-tracing signal that in the direction of transmission of the optical network line is arranged closest to the network subscriber having the master function; or (b) which relates to reception of an optical signal by the network subscriber that sent a fault-tracing signal that, in the direction of transmission of the optical network line, is arranged closest to the network subscriber having the master function; or (c) which relates to that part of the optical network line that is between (i) one of the other network subscribers that, in the direction opposite to the direction of transmission in the optical network line, is arranged upstream of the network subscriber sending a fault signal that in the direction of transmission of the optical network line is arranged closest to the network subscriber having the master function, and, (ii) that same one of the other network subscribers sending a fault-tracing signal that, in the direction of transmission of the optical network line, is arranged closest to the network subscriber having the master function.

4. The method according to claim 1, and further comprising the steps of one of the network subscribers other than the network subscriber having the master function which did not receive the initialization signal sending a fault signal via the optical network line that characterizes that network subscriber, (a) wherein, on reception of the fault signal, the network subscriber having the master function identifying a fault that relates to the transmission of an optical signal by that other network subscriber that, in a direction opposite to the direction of transmission of the fault signal in the optical network line, is arranged upstream of that network subscriber sending the fault signal; or (b) which relates to the reception of an optical signal by that network subscriber that sent the fault signal; or (c) which relates to the optical network line between the network subscriber that, in the direction opposite to the direction of transmission of the fault signal in the optical network line, is arranged upstream of the network subscriber that sent the fault signal, and the network subscriber that sent the fault signal;

wherein the network subscriber having the master function identifies a fault (a) which relates to the transmission of an optical signal by that other network subscriber that, in a direction opposite to the direction of transmission of the fault signal in the optical network line, is arranged immediately upstream of the network subscriber having the master function; or (b) which relates to reception of an optical signal by the network subscriber having the master function; or (c) which relates to the optical network line between that network subscriber which, in the direction opposite to the direction of transmission of the fault signal in the optical network line, is arranged immediately upstream of the network subscriber having the master function, and, that same network subscriber located immediately upstream of the network subscriber having the master function if the network subscriber having the master function does not receive a fault signal.

5. The method according to claim 1 and further including using a test set to replace a function of one or both of a receiver and transmitter in a network subscriber in a start and initialization phase.

6. The method according to claim 3 and further including using a test set to replace a function of one or both of a receiver and transmitter in a network subscriber in a start and initialization phase.

7. The method according to claim 4 and further including using a test set to replace a function of one or both of a receiver and transmitter in a network subscriber in a start and initialization phase.

8. The method according to claim 1 and further including the step of using a test set to replace a function of a network subscriber with respective associated transmitters and receivers in a start and initialization phase.

9. The method according to claim 3 and further including the step of using a test set to replace a function of a network subscriber with respective associated transmitters and receivers in a start and initialization phase.

10. The method according to claim 4 and further including the step of using a test set to replace a function of a network subscriber with respective associated transmitters and receivers in a start and initialization phase.

* * * * *